United States Patent Office 3,226,405
Patented Dec. 28, 1965

3,226,405
17α-ALLYL-2-ANDROSTENE-17β-OL ACETATE
Max N. Huffman, P.O. Box 1982, Colorado Springs, Colo.
No Drawing. Filed Feb. 12, 1962, Ser. No. 172,801
The portion of the term of the patent subsequent to
Aug. 14, 1978, has been disclaimed
1 Claim. (Cl. 260—397.5)

This invention relates to steroids of the 2-androstene series and to the production thereof. More particularly, this invention relates to lower alkanoic acid esters of 2-androsten-17β-ol compounds containing hydrocarbon substituents in the 17α-position. These compounds have the following general structural formula

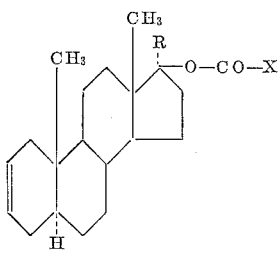

wherein R is a lower aliphatic hydrocarbon radical, such as methyl, ethyl, n-propyl, butyl, amyl, isoamyl, allyl, vinyl, ethynyl and methylethynyl, and X is hydrogen or a lower alkyl radical containing 1 to 5 carbon atoms.

The esters disclosed herein have useful physiological properties. They produce the same general physiological results as the corresponding 2-androsten-17β-ol compounds containing aliphatic hydrocarbon radicals in the 17α-position which are described in my Patent No. 2,996,524, but they are substantially more active than such compounds on oral administration. The oral effectiveness greatly enhances the usefulness of the esters in medicine. For instance, 17α-ethynyl-2-androsten-17β-ol acetate, when orally administered to young intact male rats at a dosage of 200 micrograms per day, markedly depressed the prostrate.

It is an object of this invention to produce and to provide a method for producing lower alkanoic acid esters of 2-androsten-17β-ol compounds having hydrocarbon radicals in the 17α-position. It is another object to provide lower alkanoic acid esters of 2-androsten-17β-ol compounds containing aliphatic hydrocarbon radicals in the 17α-position which ahve useful physiological properties. It is a further object to produce steroids of the foregoing type which are orally effective in suppressing the prostate of mammals. These and other objects are apparent from and are achieved in accordance with the following disclosure.

The compounds of this invention are produced by reacting a 2-androsten-17β-ol compound having an aliphatic hydrocarbon radical in the 17α-position with an alkanoic acid halide or anhydride in a basic or neutral solvent. The preferred procedure is dissolving the 2-androsten-17β-ol compound in an inert organic solvent such as chloroform, methylene chloride or carbon tetrachloride to which is added an excess of tertiary amine such as pyridine, dimethylaniline, diethylaniline or quinoline. Then an alkanoic acid chloride containing 2 to 5 carbon atoms is added, usually in an amount 2 to 5 times the stoichiometrically required for esterification. The reaction proceeds at low temperature (20–30° C.) but higher temperature can be used (e.g., 30–80° C.), Ordinarily the reaction is conducted at room temperature over a period of 10–30 hours. Then the volatile materials are removed in vacuo and the residue mixed with dilute mineral acid which dissolves the tertiary amine and leaves the insoluble steroid ester in relatively pure form. The latter can be purified by recrystallization from solvents such as a lower alkanol.

By the foregoing procedure 17α-vinyl-2-androsten-17β-ol is converted by reaction with propionyl chloride in chloroform and dimethylaniline to 17α-vinyl-2-androsten-17β-ol propionate; and 17α-methyl-2-androsten-17β-ol is converted to 17α-methyl-2-androsten-17β-ol propionate. By an analogous procedure, 17α-propyl-2-androsten-17β-ol is converted by reaction with isobutyryl chloride in chloroform and dimethylaniline to 17α-propyl-2-androsten-17β-ol isobutyrate; 17α-ethynyl-2-androsten-17β-ol is converted to 17α-ethynyl-2-androsten-17β-ol isobutyrate; and 17α-methyl-2-androsten-17β-ol is converted to 17α-methyl-2-androsten-17β-ol isobutyrate.

An alternative procedure is that of dissolving the 2-androsten-17β-ol compound containing an aliphatic hydrocarbon radical in the 17α-position in an excess of an alkanoic acid anhydride such as acetic anhydride or propionic anhydride, preferably with an acid catalyst such as toluenesulfonic acid or benzenesulfonic acid. The reaction proceeds at low temperature (20–30° C.) although it may be conducted at higher temperatures such as those in the range of 50–150° C. At low temperature the reaction requires 10–30 hours and at higher temperatures 1–10 hours. After the reaction is complete the reaction mixture is poured into ice water and agitated to decompose the excess acid anhydride. The steroid ester forms a precipitate in the aqueous solution and is removed and purified.

The invention is disclosed in further detail by means of the following examples which are provided merely for the purpose of illustrating the invention. It will be appreciated by those skilled in the art that numerous modifications in equivalent materials and operating conditions can be made without departing from the invention as disclosed herein.

*Example 1.—17α-allyl-2-androsten-17β-ol acetates*

To a solution of 2 grams of 17α-allyl-2-androsten-17β-ol in 100 ml. of dry chloroform were added 30 ml. of anhydrous dimethylaniline and 15 ml. of acetyl chloride. The solution became warm and turned blue. It was left at 22° C. for 16 hours, then evaporated in vacuo to remove chloroform and acetyl chloride. The residue was agitated with 400 ml. of ice water containing 35 ml. of concentrated hydrochloric acid. A white solid precipitate of 17α-allyl-2-androsten-17β-ol acetate formed. This was removed by filtration, washed with water and dried . The 17α-allyl-2-androsten-17β-ol acetate was recrystallized from aqueous methanol and had a melting point of 114–114.5° C.

By the same procedure 17α-methyl-2-androsten-17β-ol acetate (M.P. 124–124.5° C.) and 17α-propyl-2-androsten-17β-ol acetate (M.P. 115–115.5° C.) were prepared.

*Example 2.—17α-ethynyl-2-androsten-17β-ol propionate*

17α-ethynyl-2-androsten-17β-ol propionate is produced by the method of Example 1 from 200 mg. of 17-α-ethynyl-2-androsten-17β-ol, 10 ml. of dry chloroform, 3 ml. of dry dimethylaniline and 17.5 ml. of propionyl chloride.

*Example 3.—17α-ethyl-2-androsten-17β-ol acetate*

A solution of 266 mg. of 17α-ethyl-2-androsten-17β-ol in 50 ml. of redistilled acetic anhydride was refluxed for 4 hours under anhydrous conditions. The solution was poured into 500 ml. of water and agitated until the acetic anhydride had decomposed. The mixture was then refrigerated until a precipitate of 17α-ethyl-2-androsten-17β-ol acetate formed. This was removed by filtration, washed with water and dried. After recrystallization from aqueous methanol, 17α-ethyl-2-androsten-17β-ol acetate had a M.P. of 147.5–148° C.

*Example 4.—17α-ethynyl-2-androsten-17β-ol acetate*

To a solution of 600 mg. of 17α-ethynyl-2-androsten-17β-ol in 10 ml. of acetic anhydride was added 600 mg. of p-toluenesulfonic acid. The resulting solution was allowed to stand at 20° C. for 18 hours protected from the atmosphere. It was then poured into 200 ml. of ice water and the mixture was refrigerated for 3 hours. The precipitate of 17α-ethynyl-2-androsten-17β-ol acetate was collected on a filter, washed with water and dried. After recrystallization from aqueous methanol, 17α-ethynyl-2-androsten-17β-ol acetate had a M.P. of 127–127.5 C.

What is claimed as new and is desired to be secured by Letters Patent of the United States is:

17α-allyl-2-androsten-17β-ol acetate.

References Cited by the Examiner

UNITED STATES PATENTS

| | | | |
|---|---|---|---|
| 2,944,067 | 7/1960 | Johns | 260—397.3 |
| 2,944,068 | 7/1960 | Johns | 260—397.5 |
| 2,996,524 | 8/1961 | Huffman | 260—397.5 |
| 3,079,406 | 2/1963 | Knox | 260—397.1 |

LEWIS GOTTS, *Primary Examiner.*

MORRIS LIEBMAN, *Examiner.*